April 6, 1954 S. ALTER 2,674,672
HANDLE-OPERATED ELECTRIC MOTOR STARTING SWITCH
Filed Oct. 18, 1950 7 Sheets-Sheet 1

Inventor:-
Siegfried Alter,
By
Smith, Michael and Gardiner
Attorneys.

April 6, 1954 S. ALTER 2,674,672
HANDLE-OPERATED ELECTRIC MOTOR STARTING SWITCH
Filed Oct. 18, 1950 7 Sheets-Sheet 3

Inventors:—
Siegfried Alter,
By
Smith, Michael and Gardiner,
Attorneys

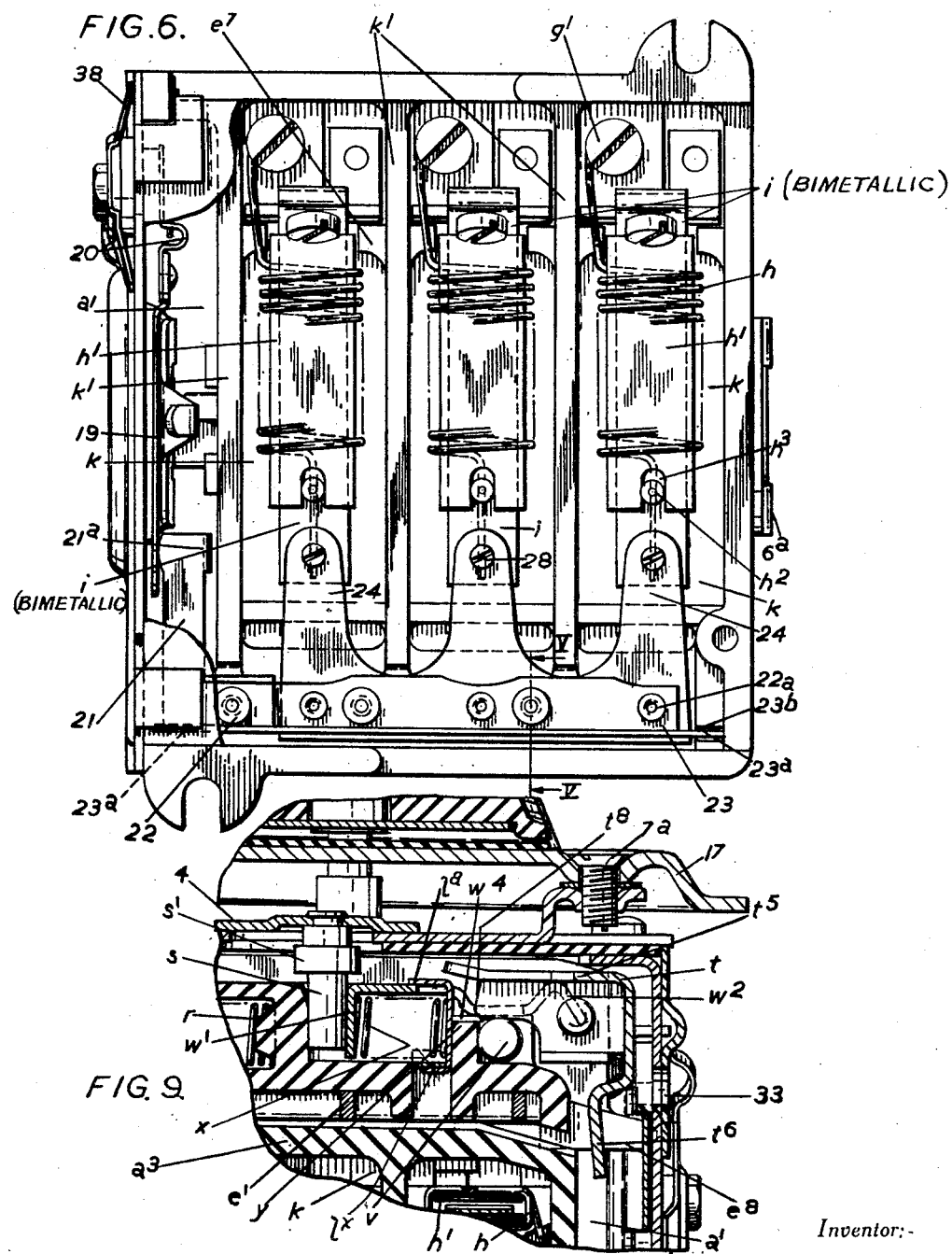

April 6, 1954  S. ALTER  2,674,672
HANDLE-OPERATED ELECTRIC MOTOR STARTING SWITCH
Filed Oct. 18, 1950  7 Sheets-Sheet 6
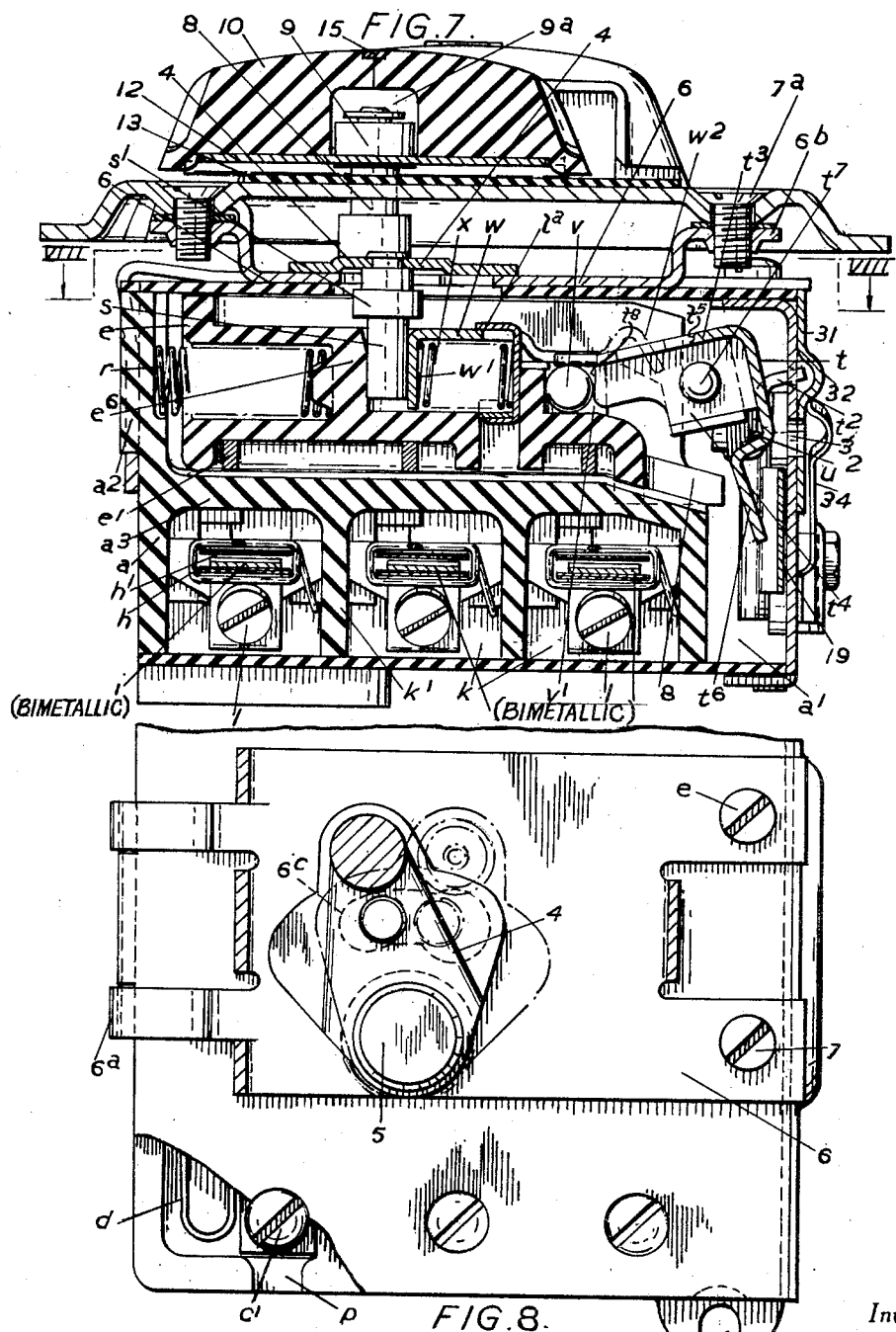
Inventor:
Siegfried Alter,
By Smith, Michael and Gardiner,
Attorneys.

April 6, 1954 S. ALTER 2,674,672
HANDLE-OPERATED ELECTRIC MOTOR STARTING SWITCH
Filed Oct. 18, 1950 7 Sheets-Sheet 7
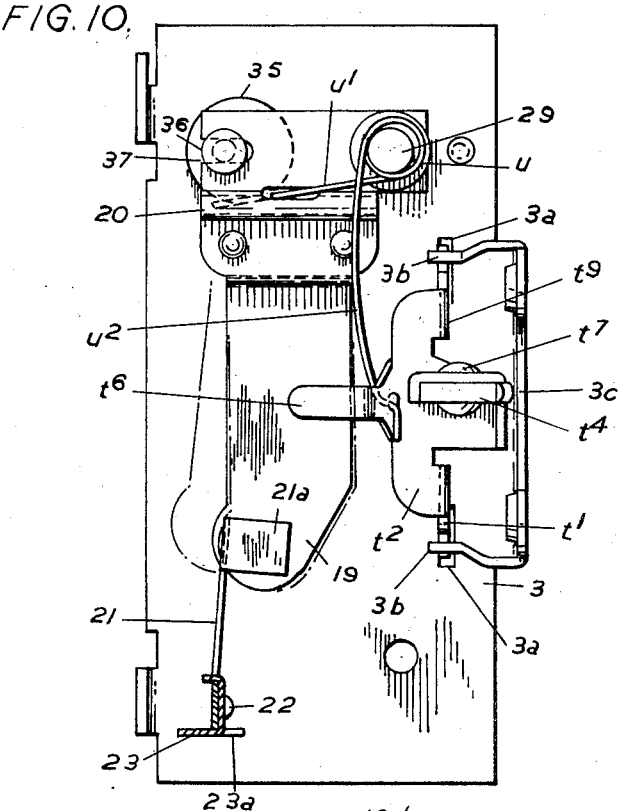
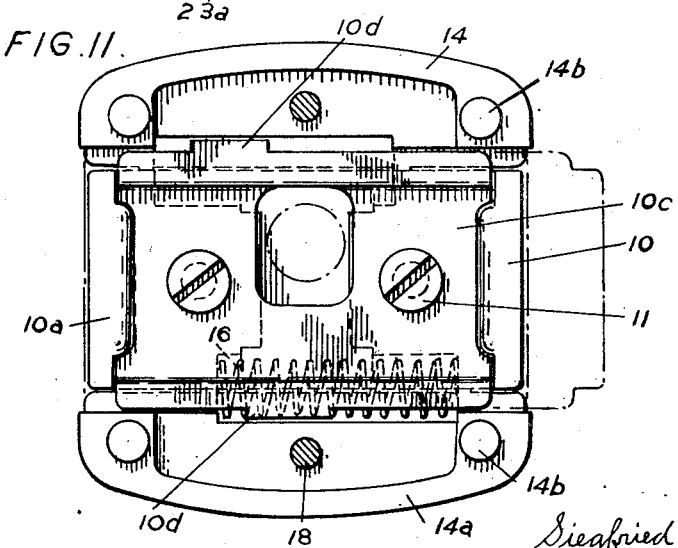
Inventor:-
Siegfried Alter.
By Smith, Michael and Gardiner,
Attorneys.

Patented Apr. 6, 1954

2,674,672

UNITED STATES PATENT OFFICE 2,674,672

HANDLE-OPERATED ELECTRIC MOTOR STARTING SWITCH

Siegfried Alter, Walsall, England, assignor to J. A. Crabtree & Co. Limited, Walsall, England, a British company Application October 18, 1950, Serial No. 190,721

Claims priority, application Great Britain March, 2 1950

21 Claims. (Cl. 200—116)

1

This invention relates to improvements in handle-operated electric motor starting switches and is particularly concerned with single or multi-pole switches having a relay device in each pole for affording protection to the motor against overloads.

The principal object of the invention is to provide an improved compact arrangement of small size, adapted to facilitate servicing and maintenance, while being capable of simple production and possessing efficient electrical characteristics.

According to one feature of the invention, the insulating base of the switch is partitioned so as to accommodate the terminals, contacts, and actuating mechanism, in a front chamber, and the thermal overload devices in a rear chamber. The arrangement enables the bimetal elements of such thermal overload devices to be of appropriately efficient length while preserving the small dimensions of the switch. The working parts of the bimetals of said thermal overload devices are preferably substantially straight undeformed strips with encircling heater wires insulated from the bimetals, for example, by loose interposed mica plates.

According to a further feature of the invention, a catch mechanism is interposed between a spring-pressed moving contact carrier and the switch base for holding the switch actuating means in the "on" position, such catch mechanism riding over anti-friction means, for example a ball or roller, for ensuring smooth operation.

According to another feature of the invention, the insulating switch base, formed with compartments for the mounting of the fixed and moving contacts, is deeply recessed for the reception of terminals, the heads of which are thereby protectively disposed well to the rear of the front surface of the base, channels or openings being formed in the walls of the base for the passage of conductors to the terminals. The possibility of inadvertent contact with live metal parts is thereby reduced and safety conditions are ensured.

According to another feature of the invention, the handle is operated by a transversely operable slider member disposed between upper and lower shrouding ribs adapted to prevent accidental displacement of such member, which member is disposed between the ends of such ribs when in the "off" position, and has one end protruding beyond such ends when in the "on" position, in order to facilitate switching-off. The arrangement also contributes to the reliable operation of the switch in positions in which it is difficult to see the switch, thereby minimising the risk of errors in operation. The handle, on which the slider is mounted with a degree of lost-motion, may be pivotal with respect to the slider, in such manner that after an initial angular movement for normally effecting a breaking of the contacts, a further angular movement is effective for positively disengaging the contacts. Thus the handle provides a quick break of the contacts and ensures a positive drive in both directions. Instead of being connected with a slider, the handle may be operated by linkage or the like.

In order to enable the invention to be readily understood, reference will now be made to the accompanying drawings illustrating by way of example, one construction of three-pole manually operated starting switch having a thermal overload release device in each pole, in which drawings:

Figure 6 is a rear elevation with the back plate removed to disclose the overload chamber.

Figure 7 is a section on the line VII—VII of Figure 2, with the front cover in position.

Figure 8 is a section on the line VIII—VIII of Figure 7.

Figure 9 is a view similar to Figure 7, but showing the clutch plate and associated parts in the "off" position.

Figure 10 is an elevation of the end plate and the parts mounted thereon, including the stressed blade and catch plate, removed from the switch, the ambient and its mounting being also shown in this figure.

Figure 11 is a rear view of the slidable handle.

Figure 2:
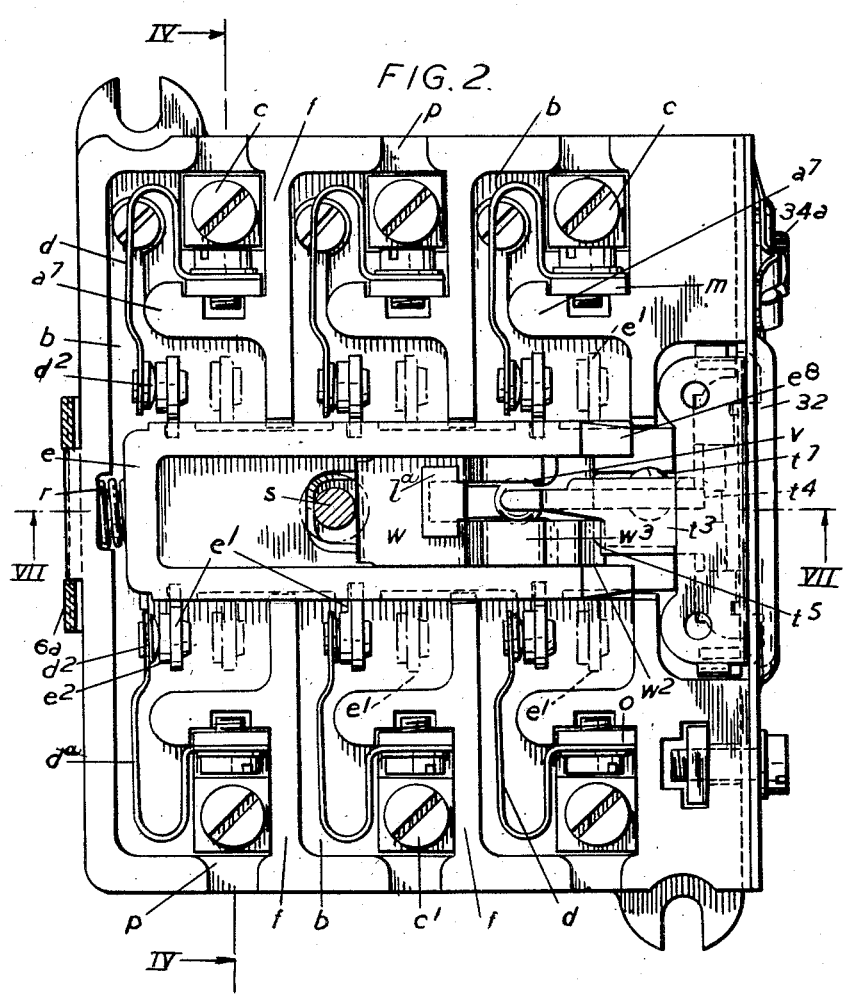
Figure 2 is a front elevation with the front cover removed and showing the front contact chamber.
Figure 4:
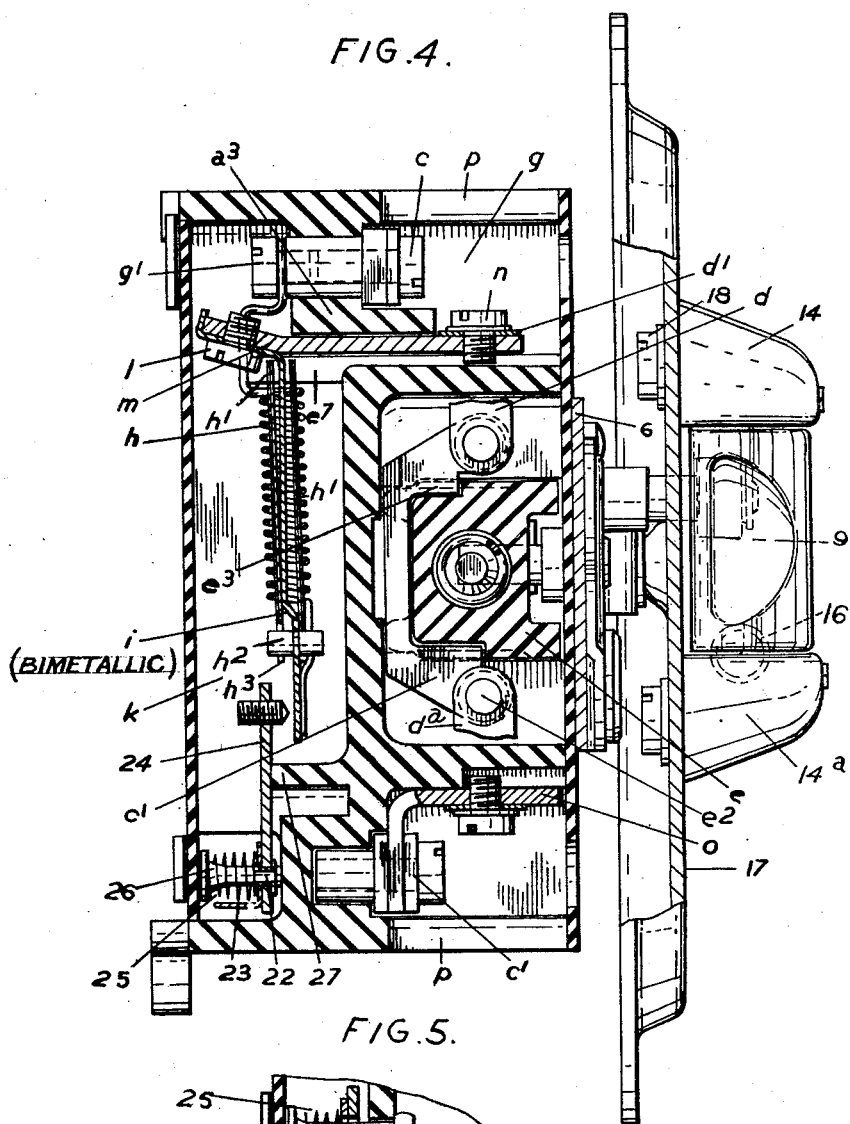
Figure 4 is a section on the line IV—IV of Figure 2, with the parts of the cover shown in elevation.
Figure 5:
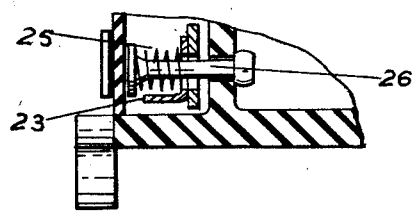
Figure 5 is a section on the line V—V of Figure 6.

Referring to the drawings, a block or base $a$ of insulating material has front and rear chambers separated by a middle wall $a^3$ (see Figures 7 and 9), the front chamber being formed with partitions $f$ to provide three top and bottom compartments $b$ each adapted for the reception of a terminal $cc^1$ and a fixed contact $d$ (see Figure 2), while the rear chamber is formed with partitions $k^1$ (see Figure 6) to provide compartments $k$ in each of which is disposed a thermal overload relay device as hereinafter described. At one side of the base and extending its entire depth is a chamber $a^1$ (see Figure 7), closed by a metal plate 3, this chamber being provided for receiving the trip mechanism. An insulating moving contact carrier $e$ (see Figure 2) is slidable horizontally between the upper and lower compartments $b$ in order to effect engagement or disengagement of contact plates $e^1$ thereon with the fixed contacts $d$. The terminals $cc^1$ may be disposed in deep recesses $g$, Figure 4, so that their screw heads, which are disposed well to the rear of the surface front of the base, are not liable to be inadvertently touched.

The side walls of the base are formed with channels or openings $p$ (see Figure 4) to enable cables to be introduced laterally under clamps, the screws being tightened to secure the conductors in position. The pillar of the upper terminal $c$ extends through the wall $a^3$ (see Figure 4) separating the front and rear chambers, and its rear end is connected by a screw $g^1$ to the upper end of a heater wire $h$ which is coiled around, and is welded at its other end to a bimetallic strip $i$ disposed in a compartment $k$ in the rear chamber. The upper end of the bimetal is connected by a screw $l$ to a strap $m$ extending through an opening in the wall $a^3$ of the base, the forward end of the strap being connected by a screw $n$ to one of the fixed contacts $d$, the outer end of the other fixed contact $d^a$ being screw-connected to a strap $o$ disposed in a recess in the front chamber and riveted to the other terminal $c^1$. Each of the fixed contacts $d$ is in the form of a looped resilient blade having a silver contact $d^2$ at its inner end, the looped formation enabling it to be pre-stressed so that it presses against a stop formation $a^7$ of the base, in the "off" position. As a result, when operated to the "on" position, each moving contact $e^1$ encounters a pressure immediately upon contact engagement.

Each bimetal strip $i$ is separated from its heater coil $h$ by a pair of flat elongated mica plates $h^1$ which are engaged at their upper ends by ribs $e^7$ of the casing and at their lower ends by a centralising rivet $h^2$ entering locating slots $h^3$ in the mica plates. The ribs $e^7$ also prevent the possibility of short circuit between a heater coil and its strap $m$. The mica shields, which are wider than the bimetal, are loose so as not to interfere with the bending of the bimetal. Only a low watt input is necessary for obtaining adequate movement of the bimetal, because the latter is not required to effect bending movement of the insulating means as in the case of a sleeve or plates tightly enclosing or surrounding the bimetal.

The silver buttons $d^2$ on the inwardly directed ends of each pair of fixed contacts are adapted to be bridged by the co-operating silver buttons $e^2$ on the inner ends of U-shaped moving contact plates $e^1$ on the insulating carrier $e$. The connecting limb of each U-shaped plate is located in a groove on the rear surface of the carrier and its arms in upper and lower grooves $e^3$ therein. The grooves of each pair are of different lengths and the inner surfaces of the arms of each moving contact are correspondingly formed (see Figure 4) to ensure correct assemblage of the contacts on the carrier. These arms extend above and below the carrier so that the buttons $e^2$ thereon are enabled to engage with the buttons $d^2$ of the fixed contacts.

One end of the carrier $e$ is of channel section for receiving a clutch mechanism, Figures 7 and 9, which clutch mechanism includes a two-armed lever $t$. The other end of carrier $e$ is of socket-like shape for the reception of a helical compression spring $r$ which acts between the base $a$ and a partition $e^6$ of the carrier for urging the carrier rightwards (Figure 2), in order to disengage the contacts. The carrier, which may be moved leftwards against the action of the spring $r$ by means of a stud $s$, actuated as hereinafter described, is retained in the "on" position, with the contacts engaged, by means of the two-armed lever $t$ of the clutch mechanism which, in effect, constitutes a catch plate or coupling. Lever $t$, as best shown in Figure 10, is formed with lateral wings $t^2$ having lugs $t^9$ which enable it to be pivoted on the plate 3, and with ears $t_1$ which project into apertures $3^a$ in the plate. Arms $3^b$, bent down from a bracket formation $3^c$ on the plate, retain the ears in the apertures with the lever held in position on the plate.

The lever arm $t^3$ extending into the carrier, is flanged, and to this flange is secured, by a rivet $t^7$, a hardened L-shaped metal plate $t^4$. The inner end $t^8$ of this plate is of arcuate shape having its centre at the pivotal point of the lever on the plate 3, that is, at the point where the wings $t^2$ are pivoted on the plate 3. The other arm $t^6$ of the lever is engaged by the depending leg $u^2$ of the spring $u$ which influences the lever to the position Figure 7, for retaining the carrier $e$ in the "on" position.

The shaped end $t^8$ of the plate $t^4$ and the extremity of the lever arm $t^3$ are adapted for engagement with a ball or roller $v$ disposed in a horizontal guide $v^1$ near the right end of the carrier. An L-shaped metal bracket $w$ is slidably secured in the carrier $e$ by means of a blank $l^a$ and it is slidable against the action of a helical compression spring $x$ disposed between a short arm $w^1$ of the bracket and this blank, which abuts against a wall $y$ of the carrier. The extremity of the longer arm is formed as a ramp $w^2$ for engagement with an edge $t^5$ of the catch plate to enable the latter to be disengaged from its locking engagement with the ball $v$. This longer arm is disposed in a different plane from that of the plate $t^4$, so that the bracket can move relatively to the lever without bearing on the latter.

For convenience in assembly, the blank $l^a$ is in the from of a T-shaped member the leg of which is introduced to one side of the spring $x$ and its extremity $l$ is then bent, as seen in Figure 9, by a suitable tool for holding the bracket $w$ in position in the carrier. An extended arm $w^4$ of this bracket also serves to restrict the forward movement of the ball $v$.

The stud $s$ for operating the moving contact carrier $e$ extends rearwardly from a plate 4 pivotally mounted at its lower end by a rivet 5 on a plate 6 secured to the base $a$ by means of screws 7, which screws engage in tapped openings in the bracket portion $3^c$ of the plate 3. A rearward U-shaped side $6^a$ of this plate embraces a projection $a^2$ of the base for retaining the plate in position thereon. At the corner connection of these sides with the plate 6 a degree of flexibility is provided to enable the plate to be clipped in positon while taking up production tolerances. The plate 6 is formed with two raised lateral ears $6^b$ into tappings in which are introduced screws 7ᵃ for securing a cover plate 17 in position thereon. The stud s, which is riveted to the pivotal plate midway between its ends and extends through an arcuate slot 6ᶜ in the fixed plate 6, is influenced to occupy a position at the rightwards end of this slot by means of the spring r which acts on the carrier e, this end of the slot being enlarged to enable the introduction of an enlarged collar s¹ which has flanged guiding engagement with the edges of the narrow part of the slot.

Figure 1:
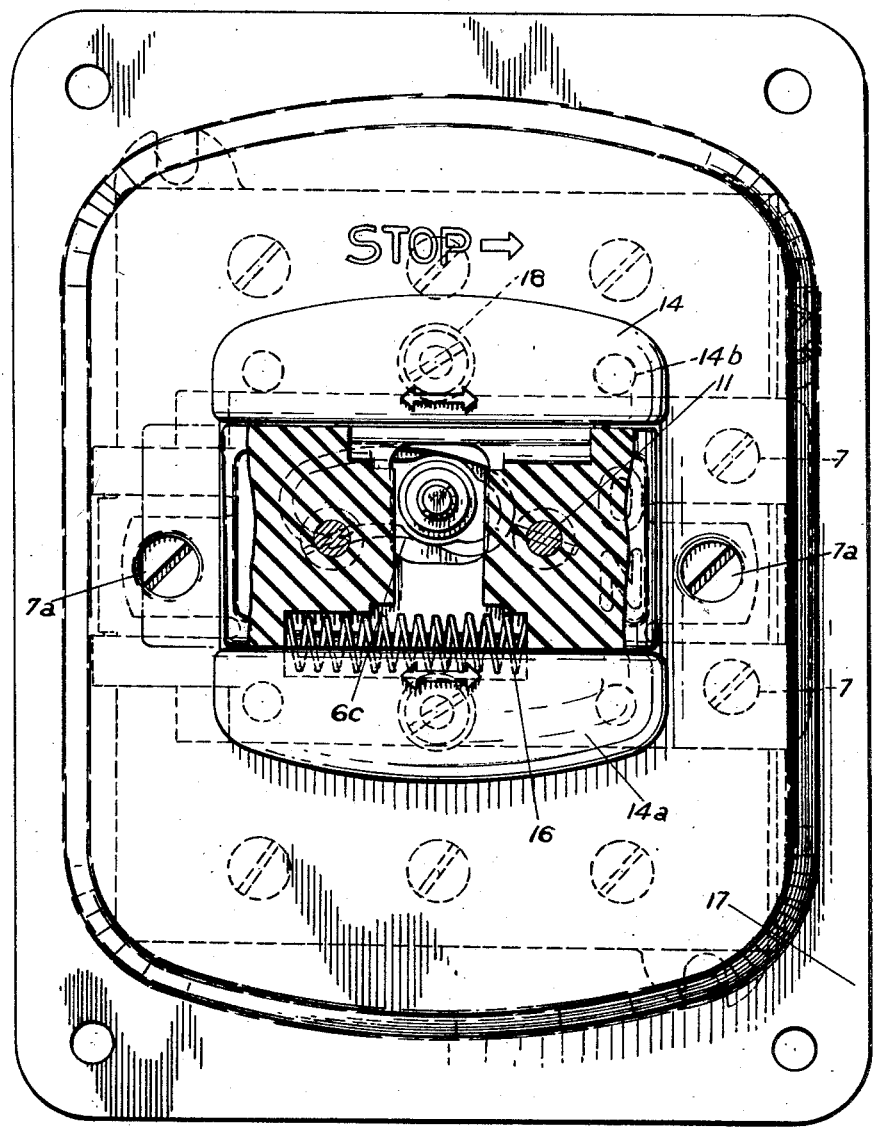
Figure 1 is a front elevation with parts in section.

An insulating slider 10, 10ᵃ, Figure 11, is guidingly movable between upper and lower ribs 14, 14ᵃ, which may be die castings, secured by screws 18 to the cover 17, and a helical spring 16 is operative between the lower rib 14ᵃ and the slider for normally returning the latter to a position in which its ends coincide with the ends of the ribs as shown in Figure 1. This corresponds to the "off" position of the switch and it is only in this position that both securing screws 7ᵃ for the cover are exposed. The ribs, which are formed with locating studs 14ᵇ entering holes in the cover 17, act protectively for preventing inadvertent actuation of the slider, operation of which requires endwise pressure so that one end is displaced beyond the ribs for switching "on." The ribs may be readily removed to enable the indication plate 13 to be reversed or changed. The slider parts 10, 10ᵃ, separated by a thin metal strip 15 may be distinctively coloured, for example green and red, for indicating which end should be pressed to ensure the desired operation of the switch and they are secured by screws 11, Figure 11, to a metal plate 10ᶜ having lugs 10ᵈ for slidably retaining the parts between the ribs. The plate 10ᶜ slides on a thin sheet 13 of insulating material which bears a legend such as "on," which is disclosed in the appropriate position of the handle. Extending from the upper end of the pivotal plate is a pin 8 on the forward end of which is a roller 9 which is disposed in the recess 9ᵃ formed between the parts 10, 10ᵃ.

In operation, movement of the slider 10, 10ᵃ, leftwards to the "on" position, against the action of the handle spring 16, causes the movement of the carrier e to engage the moving contacts e¹ with their complementary fixed contacts d². The plate t⁴ secured to the catch plate rides over the ball v until, in the engaged position of the contacts, the pressure of the spring u² causes the shaped end t³ to be pressed rearwards into locking engagement with the ball for preventing return of the carrier e. Thus the plate t acts as an abutment for maintaining the carrier in the "on" position until the handle is operated to the "off" position. When this takes place the stud s moves the L-shaped member w rightwards, against the action of the spring x, until the ramp or incline w² thereof encounters the edge t⁵ of the catch plate and causes it to be turned forwards and disengaged from its locking engagement with the ball. Thereupon the carrier spring r is enabled to move the carrier and disengage the contacts. During this operation the ball moves in its guide and the frictional engagement between it and the catch toooth is thereby reduced to a minimum.

The rectangular plate 3 has secured to its inner surface, a blade 19, Figure 10, which is stressed by a spring 20 so as to move away from the plate, and which is adapted for engagement with the rearwardly extending arm t⁶ of the catch plate. The blade is normally restrained from exerting pressure on such arm by means of an ambient arm 21 which is attached by a rivet 22 to an L-section metal bar 23 to which is secured by rivets 22ᵃ an insulating arm, three lateral extensions 24 of which, are adapted to be engaged by the ends of the bimetal elements i. During overload conditions, the bending of the bimetal i acts on the trip bar 24 to cause the pivoting of the metal bar 23, against the action of helical springs 25 each of which acts between the bar, and a stud 26 carried by the base, for normally pressing the bar against stop formations 27 of the base. The upper end of each extension 24 is provided with an adjustable screw 28 which enables individual adjustment of an extension in relation to its cooperating bimetal. The metal bar 23 is formed with ends 23ᵃ which enter recesses 23ᵇ in the base to provide pivot mountings. Pivoting of the bar 23 causes rearward movement of the ambient 21 so as to remove it from obstructive engagement with the stressed blade 19 which is then free to turn outwards away from the rectangular metal plate 3 and impinge on the leg t⁶ of the catch plate which is turned to the position shown in Figure 9, and disengaged from its locked engagement with the ball v of the carrier e, which can then be moved by the spring r to carry the moving contacts e¹ to the "off" position, as seen in chain lines in Figure 2.

Rightwardly projecting noses e⁸ on the moving contact carrier are adapted to engage the stressed blade 19 to press it towards the plate 3 and this enables the catch plate to re-engage the ball v when the handle is operated. A lateral flag-like extension 21ᵃ on the ambient ensures that the latter is always re-engaged on the appropriate side of the stressed blade 19. When the switch is "on," the ball v is disposed to the rear of the dead center position, of the lever t, so as to avoid the possibility of inadvertent operation to cause tripping. The arrangement necessitates a relatively powerful force to effect tripping, but this is produced with a relatively light action of the bimetals, owing to the mechanical advantage with which the bar acts on the ambient. Moreover the presence of the gap between the stressed plate 19 and the leg t⁶ ensures that the former impinges on the leg t⁶ with an impact or blow so that a correspondingly small force is required for operation by the bimetal.

Figure 3:
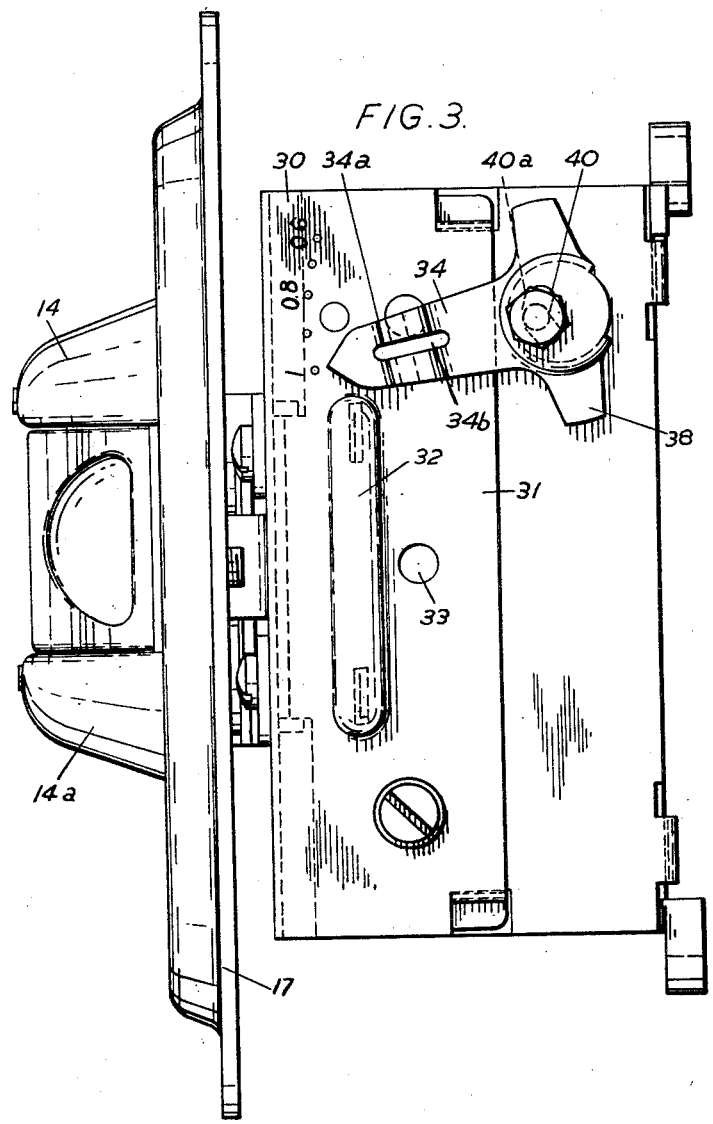
Figure 3 is a side elevation.

The stressed spring blade 19 can be turned about a pivot 29 at its upper corner for adjustment purposes thereby requiring a greater or lesser movement of the bimetals, and the ambient, to effect tripping of the switch. One position of adjustment is shown in chain lines in Figure 10. The degree of adjustment may be measured on a scale 30 on a label plate 31, Figure 3, which is attached to the plate 3 and which is formed with a bulge 32 to accommodate the ears t¹ of the catch plate. Coinciding holes 33 in the label and the plate 3 enable the introduction of means for operation of the catch plate t, if desired, by remote control means.

The stressed blade 19 is adjustable about its pivot 29 by means of a pointer 34, the pointed end of which co-operates with the scale and the other end of which is mounted on a rotatable bush 35 pivoted in the rectangular plate and having a pin 36 which is eccentric in the bush and which is movable in a slot 37 in the blade. The pointer and the bush are individually adjustable. For adjustment a screw 40 is first loosened and the bush and pointer may be turned in the arcuate slot 40ª, the screw then being tightened for securing the parts in position. The pointer 34 is formed with a bead 34ª which is slotted at 34ᵇ between its ends, and this arrangement facilitates adjustment either by hand or by a screw driver. A leg $u^1$ of the spring $u$ enables any slack around the pivot 29 to be taken up. Two wings 38 on the pointer are slightly bent so as to exert pressure on the plate and enable it to be frictionally retained in positions of adjustment, and these wings abut against the label plate in respective extreme positions and thereby restrict the angular movement of the pointer.

The cover of the sheet metal box, which is provided with suitable conduit entries, is adapted to be removed only when the switch is in the "off" position.

Having thus described my invention I claim:

1. A handle-operated electric motor starting switch comprising an insulated base chambered and partitioned and having walls defining a front chamber, a rear chamber, and an end chamber in said base; pairs of fixed contacts in said front chamber; a carrier in said front chamber slidable between opposite pairs of said fixed contacts; transverse moving contacts mounted on said carrier for engagement with said fixed contacts; thermal relay devices disposed in said rear chamber; manually operable means for said carrier mounted on the wall defining the front of said front chamber; and means mounted in said end chamber and controlled by said thermal relay devices for automatically tripping said carrier and comprising a catch mechanism adapted to be released by said thermal relay devices upon overload conditions.

2. A handle-operated electric motor starting switch comprising an insulated base chambered and partitioned and having walls defining a front chamber, a rear chamber, and an end chamber in said base; pairs of fixed contacts in said front chamber; a carrier in said front chamber slidable between opposite pairs of said fixed contacts; transverse moving contacts mounted on said carrier for engagement with said fixed contacts; thermal relay devices mounted in said rear chamber and each including a strip-like bimetal element; manually operable means for said carrier for controlling the position of the contacts thereon with respect to said fixed contacts; means mounted in said end chamber and controlled by said thermal relay devices for automatically tripping said carrier and comprising a catch mechanism adapted to be released by said thermal relay devices upon overload conditions, the plane of movement of the moving contacts being parallel to the plane of the bimetal elements in said rear chamber and to the partitions which separate said front and rear chambers.

3. A handle-operated electric motor starting switch comprising an insulating base having a partition to define front and rear chambers in said base; a bimetal overload release device mounted in said rear chamber and including a straight bimetal element; a common releasable catch mechanism operated by said bimetal overload release device; a manually operable device for actuating said catch mechanism; and fixed and movable contacts mounted in said front chamber, the plane of movement of said movable contacts being parallel to said partition and to the plane of said bimetal element.

4. A handle-operated electric motor starting switch comprising manual operating means; a trip mechanism; a thermal overload release device including a straight bimetal element operable on said trip mechanism to release the same to open contact position; pairs of fixed contacts; a slidable carrier movable between opposite pairs of said fixed contacts; spaced contact plates on said carrier for engagement with said pairs of fixed contacts; and a catch mechanism operated on by said thermal overload release device upon overload conditions and comprising a right-angled lever, one arm of which is actuated by said trip mehcanism, and the other arm of which is disposed in line with said slidable carrier and is actuated by said manual operating means.

5. A handle-operated electric motor starting switch comprising manual operating means; a trip mechanism; a thermal overload release device including a straight bimetal element operable on said trip mechanism to release the same to open contact position; pairs of fixed contacts; a slidable carrier movable between opposite pairs of said fixed contacts; spaced contact plates on said carrier for engagement with said pairs of fixed contacts; a catch mechanism operated on by said thermal overload release device upon overload conditions and engageable with said carrier for retaining the contact plates thereon in engagement with said pairs of fixed contacts; and antifriction means interposed between said carrier and said catch mechanism, said trip mechanism being actuated by said thermal overload release device upon overload conditions and being operable on said catch mechanism for releasing said carrier.

6. A handle-operated electric motor starting switch comprising an insulating base having partitions and walls to define front, rear, and end chambers, said end chamber extending from the front to the rear of said base; fixed contacts disposed in pairs in said front chamber; a carrier in said front chamber movable between opposite pairs of said fixed contacts; contact plates on said carrier for engagement with said fixed contacts; overload release devices in said rear chamber and each including a straight bimetal element disposed in a plane parallel to the direction of movement of the carrier in said front chamber; a catch mechanism mounted in said end chamber and including a two-armed lever, one arm of which is disposed substantially in line with said carrier, and the other arm of which is disposed substantially in line with said end chamber and is adapted to be tripped by the overload release devices upon overload conditions for releasing said catch mechanism; and manually operated means on the front wall defining said front chamber for actuating said carrier.

7. An electric motor starting switch having a handle for operation of the switch to the "on" and "off" positions thereof; pairs of fixed contacts; a carrier movable between said pairs of fixed contacts and having spaced contacts thereon for engagement with said fixed contacts; a thermal overload release device for said carrier; a spring operative on said carrier to disengage the contacts thereon from said fixed contacts; a pivotally mounted catch lever engageable with said carrier and adapted to hold said carrier in the "on" position of said fixed and movable contacts against the action of said spring; trip mechanism for said catch lever actuated by said thermal overload release device and operative on said catch lever to permit said spring to move said carrier to the "off" position of said fixed and movable contacts; and antifriction means interposed between said lever and said carrier.

8. An electric motor starting switch having a handle for operation of the switch to the "on" and "off" positions thereof; pairs of fixed contacts; a carrier movable between said pairs of fixed contacts and having spaced contacts thereon for engagement with said fixed contacts; a thermal overload release device for said carrier, said carrier being so formed as to provide a channel section at one end thereof; a catch lever operable on said carrier and positioned adjacent the channeled end thereof; antifriction means disposed between the channeled end of said carrier and said catch lever; the other end of said carrier having a socket therein; a helical compression spring disposed in said socket and operative on said carrier for urging it to a position for disengaging the contacts on said carrier from said fixed contacts; a handle for moving said carrier to cause engagement of said fixed and movable contacts; and trip means for said catch lever operated by the overload release device for releasing said catch mechanism to permit said spring to move the contacts on said carrier out of engagement with said fixed contacts.

9. An electric motor starting switch in accordance with claim 8, in which the movable contact carrier is provided with projections engageable with a stressed blade for enabling the catch lever to reengage the antifriction means when the handle is moved to bring the contacts on the carrier into engagement with the fixed contacts after a tripping operation of the switch by the overload release device.

10. An electric motor starting switch in accordance with claim 8, including a pivotally mounted stressed blade and a spring, one leg of which spring is adapted for influencing the catch lever to its "on" position, and another leg of which is operable for taking up slack in the position of the stressed blade about its pivotal mounting.

11. An electric motor starting switch in accordance with claim 8, including a scale and a pointer cooperating with said scale, said pointer being pivotally mounted on a rotatable bush, and said bush and said pointer being individually adjustable to vary the relationship between said scale and pointer.

12. A handle-operated motor starting switch in accordance with claim 11 including a fixed plate having an arcuate slot therein, a pivotally mounted plate having a stud extending therefrom for operating the movable carrier, a pin on said pivotally mounted plate and on which is a roller engageable with the handle which operates the movable carrier, said pin extending through the arcuate slot in the fixed plate, and a spring for influencing said pin to occupy a position at one end of said arcuate slot.

13. An electric motor starting switch in accordance with claim 8 and comprising a handle-operated plate mounted on the carrier and formed with a ramp which is engageable with said catch lever for moving it to the "off" position.

14. An electric motor starting switch having a handle for operation of the switch to the "on" and "off" positions thereof; pairs of fixed contacts; a carrier movable between said pairs of fixed contacts and having spaced contacts thereon for engagement with said fixed contacts; a thermal overload release device for said carrier; said carrier being so formed as to provide a channel section at one end thereof; a catch lever operable on said carrier and positioned adjacent the channeled end thereof; antifriction means disposed between the channeled end of said carrier and said catch lever; the other end of said carrier having a socket therein; a helical compression spring disposed in said socket and operative on said carrier for urging it to a position for disengaging the contacts on said carrier from said fixed contacts; a handle for moving said carrier to cause engagement of said fixed and movable contacts; trip means operated by the overload release device for releasing said catch lever; a stressed blade adapted to impinge upon said catch lever; a trip bar actuated by said thermal overload release device; and an ambient temperature compensating arm secured to said trip bar and adapted to prevent said stressed blade from impinging upon said catch lever.

15. In a handle-operated electric motor starting switch having an overload release device for said switch, a front plate having upper and lower ribs thereon, a moving contact carrier, a transversely sliding handle operably connected with said carrier for operating said switch to "off" and "on" positions and slidable between the ribs on said front plate, said transversely sliding handle being disposed and related to said ribs in such manner that said handle is disposed between the ends of said ribs when said switch is in the "off" position and has one end protruding beyond said ends of said ribs when said switch is in the "on" position.

16. A handle-operated electric motor starting switch having a thermal overload release device, and comprising an insulating switch base chambered and partitioned and having walls defining a front chamber, a rear chamber, and an end chamber, pairs of fixed contacts in said front chamber, a carrier in said front chamber slidable between opposite pairs of said fixed contacts, transverse moving contacts on said carrier for engagement with said fixed contacts, straight bimetal elements disposed in said rear chamber in a plane parallel to the plane of movement of said carrier, catch mechanism mounted in said end chamber engageable with said carrier and adapted to be tripped by the bimetal elements in said rear chamber upon the occurrence of overload conditions, and a handle on the wall defining the front of said front chamber for manual actuation of said carrier.

17. A handle-operated electric motor starting switch in accordance with claim 16, in which the switch base is formed with compartments for the mounting therein of said fixed and said transverse moving contacts and is deeply recessed for the reception of terminals, the heads of which terminals are protectively disposed well within the surface of the base, said base having channels formed in the walls thereof for the passage of conductors to the terminals.

18. A handle-operated electric motor starting switch in accordance with claim 16, in which the thermal overload release device includes a heater coil having one end connected to a terminal and its other end connected to one of the bimetal elements, and a trip bar for said catch mechanism adapted for actuation by said bimetal element and having individual adjustment for equalizing the gap between said trip bar and said bimetal element, the end of said bimetal element to which said one end of said heater coil is connected being adapted to impinge upon said trip bar.

19. A handle-operated electric motor starting switch in accordance with claim 18, in which there is a stop on the insulating switch base, and in which the trip bar is of L-section having lateral extensions thereon provided with adjustable screws and springs for returning said trip bar to a normal position against the stop on said insulating base.

20. A handle-operated electric motor starting switch in accordance with claim 18 in which each bimetal element is straight and is separated from and surrounded by a heater coil, said bimetal element being separated from the surrounding heater coil by loose individual interposed mica plates, one disposed on each side of said straight bimetal.

21. A handle-operated electric motor starting switch including a thermal relay device for affording protection to the motor against overloads and comprising a switch base of insulating material chambered and partitioned and having walls defining a front chamber, a rear chamber, and an end chamber; terminals, fixed, and movable contacts positioned in said front chamber; thermal overload relay devices positioned in said rear chamber; and trip mechanism including a trip bar positioned in said end chamber; each terminal relay device including a substantially straight bimetal, a heater coil surrounding said bimetal; and individual insulating mica plates interposed between said bimetal and said surrounding heater coil on each side of said bimetal, one end of said heater coil being connected to a terminal and the other end of said heater coil being connected to a bimetal, the end of said bimetal to which said one end of said heater coil is connected being adapted to impinge upon said trip bar, and said trip bar being adjustable for equalizing the gap between said last mentioned end and said bimetal.

References Cited in the file of this patent

UNITED STATES PATENTS

| Number | Name | Date |
|---|---|---|
| 1,980,487 | Werner | Nov. 13, 1934 |
| 2,342,945 | Krieger | Feb. 29, 1944 |
| 2,482,009 | Link | Sept. 13, 1949 |
| 2,496,072 | Taylor | Jan. 31, 1950 |